Figure 7:
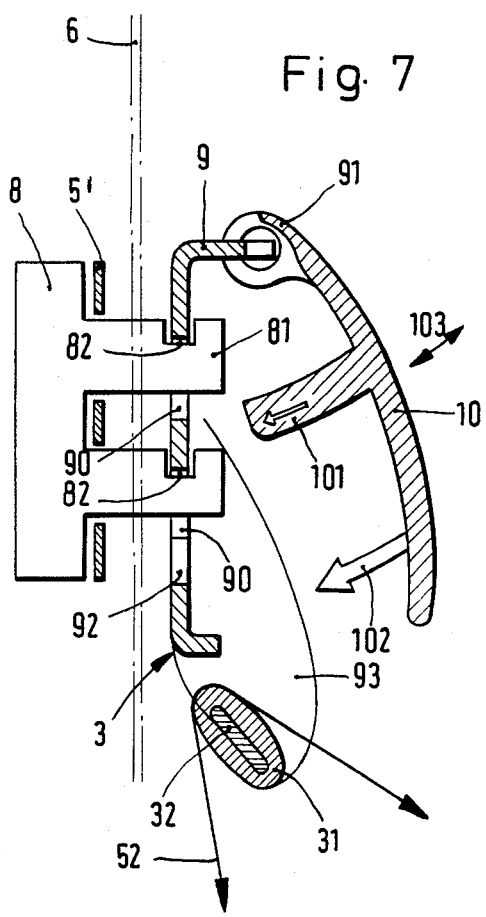

United States Patent [19]

Weman

[11] Patent Number: 4,522,426
[45] Date of Patent: Jun. 11, 1985

[54] ADJUSTABLE HOLDER FOR VEHICLE SAFETY BELT
[75] Inventor: Olaf Weman, Heverlee, Belgium
[73] Assignee: Klippan GmbH Sicherheitsgerate, Norderstedt, Fed. Rep. of Germany
[21] Appl. No.: 492,591
[22] Filed: May 9, 1983
[51] Int. Cl.³ .............................................. B60R 21/10
[52] U.S. Cl. ................................. 280/808; 280/801; 297/483; 297/486
[58] Field of Search ............... 280/801, 808; 297/483, 297/486

[56] References Cited

U.S. PATENT DOCUMENTS

| | | | |
|---|---|---|---|
| 4,311,323 | 1/1982 | Provensal | 280/801 |
| 4,350,369 | 9/1982 | Chika | 280/808 |
| 4,389,059 | 6/1983 | Stephenson | 280/808 |
| 4,398,749 | 8/1983 | Hipp et al. | 280/801 |
| 4,398,751 | 8/1983 | Wahlmann et al. | 280/808 |

Primary Examiner—Richard A. Bertsch
Attorney, Agent, or Firm—Paul & Paul

[57] ABSTRACT

A holder for a pass-through fitting for holding and conducting straps, particularly a safety belt in a motor vehicle, has fastening devices for attaching it to a support, e.g. a door column, and has a deflection piece, around which the belt passes. In order to make more rapid installation and good adjustablility in height possible, for adaptation to the anatomical dimensions of the passenger of a vehicle in each case, the invention provides that a connecting piece of the holder can be moved along the length of the toothed rack, and can be locked into it, and that the deflection piece is set on the connecting piece. It is practical for this, if the connecting piece has two flanges which surround the toothed rack, forming an approximately U-shaped cross-section.

7 Claims, 13 Drawing Figures

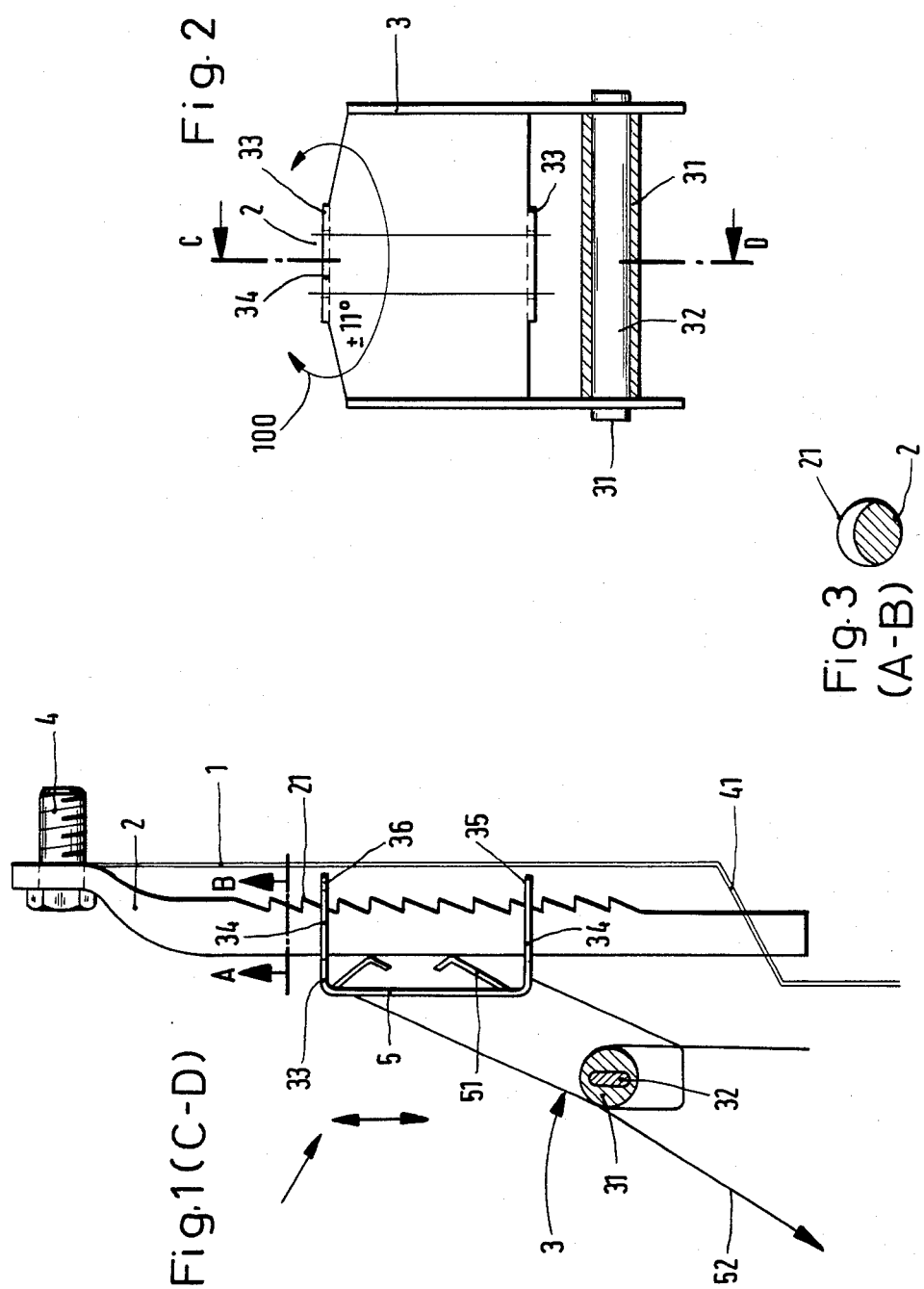

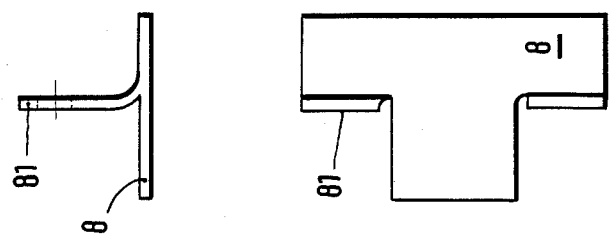
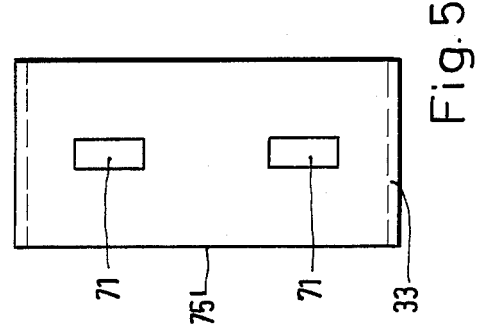
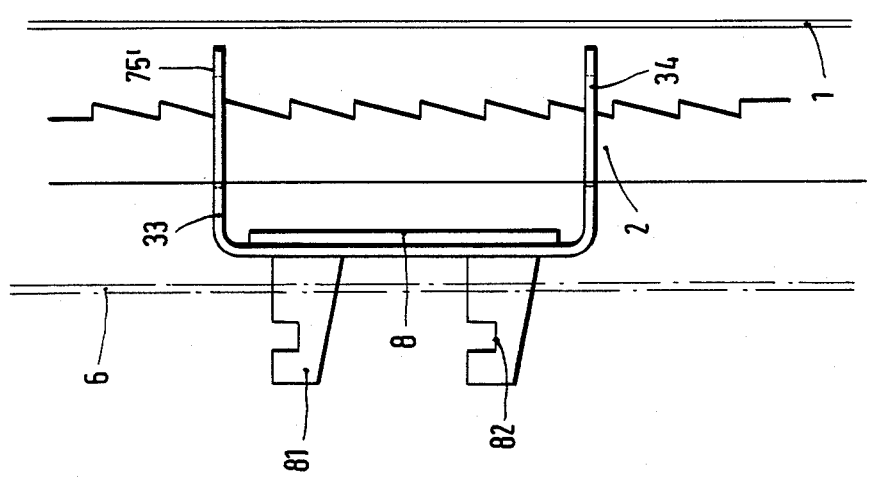

(A-A)

ADJUSTABLE HOLDER FOR VEHICLE SAFETY BELT

BACKGROUND OF THE INVENTION

The invention concerns a pass-through fitting or holder for holding and conducting straps, particularly a safety belt in a motor vehicle, with fastening devices for attaching it to a support, e.g. a door column, and with a deflection piece, around which the belt passes.

In the following, the invention will be described using the example of a pass-through fitting for a safety belt in a motor vehicle, but it is understood that the holder is not restricted to this special application.

Many different kinds of pass-through fittings are known, in which the deflection piece can be straight or bent, and where the holder for the pass-through fitting is generally difficult to install.

For the protection of the passenger who wears the safety belt, the height at which the pass-through fitting is installed on the vehicle, i.e. on its door column, is very important. If the pass-through fitting is installed too high up on the door column, the upper part of the seat belt rests on the passenger's chest in case of an accident. If, on the other hand, the pass-through fitting is installed too low down, i.e. with not enough distance from the floor of the vehicle, the passenger's body can rotate out of the belt at the time of the accident, with the result of an abnormally great forward motion of the head and shoulders of the passenger, so it is not possible to exclude the possibility of contact with the steering wheel or the dash board, with disadvantageous effects.

It is true that motor vehicle manufacturers do provide several threaded holes in the door column of some models, preferably three holes located in a relatively narrow area, in which the pass-through fitting can be fixed by means of a screw. On the one hand, this fastening possibility is disadvantageous because the height is not movable and adjustable in all positions, and on the other hand installation is complicated, so that not every vehicle owner can adjust the pass-through fitting to the correct height himself.

The task of this invention is therefore the improvement of the holder of the type initially described, in such a way that quick installation and good adjustability in terms of height, to adapt to the anatomical dimensions of each passenger, are possible.

This task is solved according to the invention by attaching a toothed rack on the support, by having a connecting piece of the holder adjustable along the length of the toothed rack, so that it can be locked into the latter, and by having the deflection piece attached to the connecting piece. The support is preferably the door column or the part of the vehicle involved, on which the pass-through fitting is to be attached. Since the invention will be explained in detail, for the comprehension of the reader, using a seat belt system as the example, it can be assumed that the support will be in the form of an approximately vertical door column, where the toothed rack is attached parallel to and at a distance from this column. The connecting piece of the entire holder therefore connects the door column with the deflection piece by way of the toothed rack, and the deflection piece holds the seat belt. The essential parts are therefore the toothed rack and the connecting piece, which can be locked into position together.

It is particularly preferable if, according to the invention, the connecting piece has two flanges, an upper flange and a lower flange which by reason of holes therein through which the tooth rack passes surround the toothed rack. Such parts can be stamped out of sheet metal, and therefore can be produced in a very economical manner, but they nevertheless have sufficient strength. The flanges reach around the toothed rack, can be moved along its length, and can be locked into place, using the appropriate tooth of the toothed rack, at the desired height. This obviously makes adjustment of the installation height of the pass-through fitting on the door column an activity that can be carried out quickly, and which is also so simple that every vehicle user can adjust the holder to the dimensions applicable to him, thereby adjusting the height on the door column.

It is furthermore advantageous, according to the invention, if the connecting piece is held in locking tension with the toothed rack by means of a spring. This makes installation even easier, because the tension makes sure that the connecting piece, and with it the deflection piece, are firmly anchored on the toothed rack in the position just set. If, later on, for example if the vehicle is sold and changes owners, the holder must be set in another position on the door column, the passenger or the vehicle owner merely has to overcome the pressure of the spring, and can then adjust the connecting piece up or down on the toothed rack to the appropriate height.

In an advantageous further version of the invention, the toothed rack has a round cross-section, each tooth extends only over approximately half of the circumference in cross-section, and there are round holes in the flanges with approximately the same diameter as the teeth in the flanges, which are set apart. By these means, the toothed rack is conducted and held in place quite accurately, in spite of simple measures; its production is very economical, and the same is true for the connecting piece with the two flanges, which are set apart and whose holes hold the toothed rack. Also, this version permits rotation of the flanges relative to the toothed rack. This rotation can be useful for the comfortability of the seat belt system, because in every case when the conduction surface, i.e. the deflection piece with its guide surface, lies perpendicular to the belt conduction direction, there is the least possible friction. This can be improved even more in combination with a very smooth surface, e.g. chrome plating or a synthetic coating. Because of the swivel possibility of the connecting piece and therefore of the entire holder, the pass-through fitting can always be placed in the position that is advantageous for minimum friction, in which the guide surface lies perpendicular to the belt direction.

It is furthermore advantageous if, according to the invention, menas are provided to restrict the rotational movement of the pass-through fitting about an angle of 5° to 20°, preferably 10° to 15°. As these means, according to a particular advantageous version of the invention, a slot can be provided between the end of the connecting piece facing the support, and the support itself. But other means can also be imagined, for example the fitting of a multi-sided or oval cross-section of the toothed rack on the one hand and a corresponding contour of the hole in the flanges of the connecting piece on the other hand. In a further version it is possible, if the holder has several parts, to hang a suspension piece with a certain tolerance or play, for example, into hooks in such a way that rotational movement is made possible. It is understood for all these versions that the rotation takes place about a vertical axis, i.e. about an axis which runs parallel to the door column, to which the toothed rack is also parallel.

It is furthermore practical, according to the invention, if the connecting piece has at least one hook which projects approximately perpendicular to the toothed rack and has recesses, and a suspension piece which can be connected with this. The construction according to the invention is simple and practical for installation and production, but for optical reasons the car manufacturer often wishes to have some kind of covering, and in the area of the door column a panel made of a synthetic or leather is preferably provided. The toothed rack and at least the flanges of the connecting piece which surround it, but in some cases even the connecting piece itself, are supposed to be sealed off from the passenger of driver. For this it is advantageous if the connecting piece is provided with the hooks described above, so that the arrangement of the entire holder, for example, can be provided in such a way that only the hooks project from a slit in the panel. These are then the holder for the pass-through fitting, which is finally placed on these hooks and locked in place there.

It is true that the hooks can be formed in one piece with the connecting piece, or can be welded to it, but it is also possible to have a two-part version of the connecting piece, where a plate with the hooks on it is laid into the connecting piece, which has corresponding holes or slots, so that the hooks project through the slots. Anchoring of such a reenforcement plate with hooks on it to the connecting piece can be carried out by point welding, for example.

In another preferred version, the suspension piece holds the deflection piece. For example, the deflection piece can be attached to the suspension piece in the form of a rod with a flat or round cross-section, and the user then only has to adjust the connecting piece, which has a hook that he can see, along the toothed rack, to the right height, and then to place the suspension piece on it.

It is advantageous here, if, according to the invention, a cover cap can be locked into the suspension piece. Often, the user wishes to have an attractive external covering, since the separate parts of a pass-through fitting and its holder are often large, and plastic caps and similar materials are often used. The lock between the suspension piece and the hook is particularly advantageous with the above measures if the cover cap is used as a locking mechanism at the same time. For example, the cover cap could have suitable projections and catches, which hook into the hooks and the suspension piece in such a way that they are locked into one another.

The user of the vehicle is able to adjust the pass-through fitting, using the new holder, quickly and suitably, without tools. The cross-sectional construction of the toothed rack can vary, preferably the round cross-section was indicated. But a U-profile or a beam profile, whether a T-profile or an I-profile, are also possible. The holes in the flanges of the connecting piece must then be shaped correspondingly.

Further advantages, characteristics and application possibilities of the present invention are evident from the following description of preferred prototypes in connection with the diagrams.

FIG. 1 shows a preliminary version of a holder, in cross-section, looking along the line C-D in FIG. 2 in which the connecting piece is formed as a single piece with a deflection piece attached to it, FIG. 2 shows a top view of the connecting piece, looking from left to right in FIG. 1, FIG. 3 shows a cross-sectional view through the toothed rack along Line A-B of FIG. 1, FIG. 4 shows a similar view as in FIG. 1, but a different version with a re-enforcement plate with hooks which project through a panel is shown, FIG. 5 shows the front view of the middle piece of the connecting piece, FIGS. 6A and 6B show the re-enforcement plate with the hooks projecting from its main plane FIG. A is an elevational view of the reinforcement plate and FIG. B is a top view, FIG. 7 schematically shows another version of a holder, where again a re-enforcement plate with hooks is attached to the connecting piece, but here a suspension piece with a cover cap is provided.

Figure 8B:
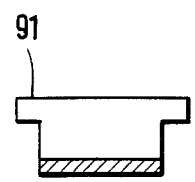
Figure 8A:
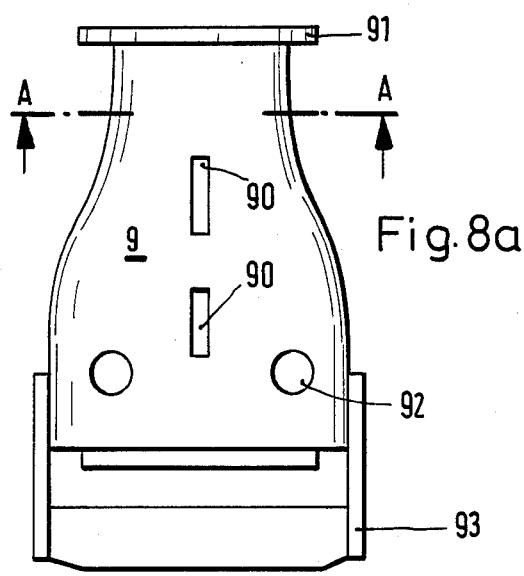
Figure 9:
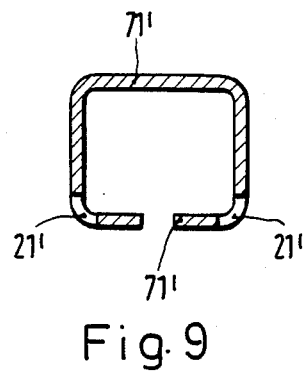
Figure 10:
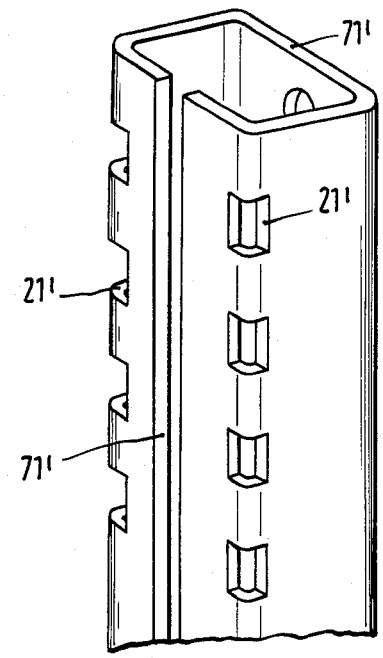
Figure 11:
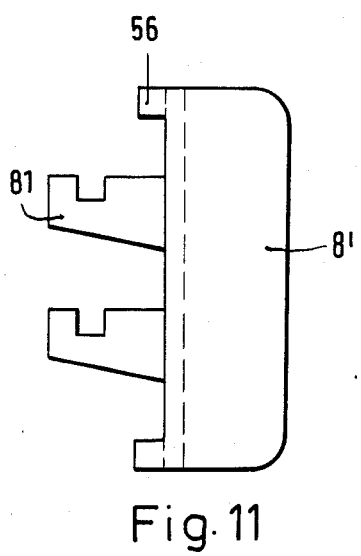
Figure 12:
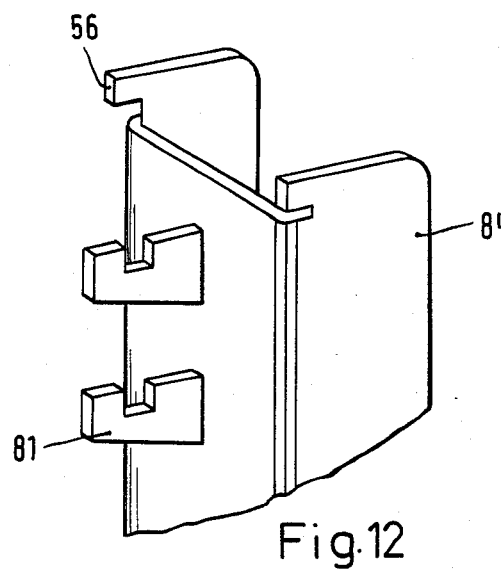

FIG. 8a shows a top view of the suspension piece, looking from left to right in FIG. 7 at the location of the panel, FIG. 8b shows the view along Line A—A of FIG. 8a FIG. 9 shows a cross-sectional view of a specially constructed door column, FIG. 10 is a perspective view of the upper part of the specially constructed door column shown in FIG. 9, FIG. 11 shows the side view of a hook support plate, and FIG. 12 shows the upper part of the same in perspective.

In the version according to FIGS. 1 through 3, a toothed rack 2 is attached to the door column 1 by means of a screw 4, and projects in a vertical direction, parallel to the door column 1, down through a hole 41. Corresponding to the representation in FIG. 3, the cross-section of the toothed rack 2 is circular, and the individual teeth 21 only extend over about half the circumference in cross-section. Circular holes 34 in flanges 33 of a connecting piece 5 have an only slightly larger diameter than that of the toothed rack 2, so that the material of the connecting piece 5, i.e. of its flanges 33, surrounds the toothed rack 2 according to the representation in FIG. 1. The connecting piece 5 is urged outwardly and held in tension against the toothed rack 2 by the pressure spring 51, in such a way that the teeth 21 are locked into the corresponding edges of the holes 34 in the flanges 33. The end 35 of the flange 33 with relation to the door column 1 can also be seen, so that a gap 36 is formed by the distance between these ends 35 and the front surface of the door column 1, with a gap size of only 1 to 5 millimeters, preferably 3 mm. This restricts the possible rotational movement of according to the circular double arrow 100 to preferably 11°.

Two side plates are attached to the connecting piece 5, which hold the deflection piece 32 with a synthetic covering 31. The seat belt is placed over this deflection piece and conducted by it. The entire holder is designated as 3.

In the version according to FIGS. 4 through 6, a panel 6 is provided, which has a lengthwise slit, not shown here, through which the hooks 81 project into the interior of the car, approximately perpendicular to the longitudinal direction of the toothed rack 2. This lengthwise slit in the panel made of leather or a synthetic material, which is not shown, only has to be approximately 1 mm wider than the width of the hook 81 in each case. Furthermore, it would be possible to have a panel 6 used in combination with the version of FIG. 1, but then a very wide slit would have to be provided, namely one that would be slightly wider than the entire holder 3 with the deflection piece 32. An appropriate cover cap could be constructed for the version in FIGS. 1 through 3, which would be long enough, and set on the holder 3 in such a way, that the long, wide slit in the panel could not be seen, and the entire structure would have an attractive appearance.

However, the comfortable construction is particularly advantageous and simple in connection with the version according to FIGS. 4 through 6, because here only a narrow slit in the panel 6 has to be provided. The connecting piece 5' which is shown in this version also has the two flanges 33, but it has two slots 71 located one above the other. Hooks 81 are placed through these with their recesses 82. The hooks 81 are part of the re-enforcement plate 8, which is shown in FIG. 6 in a stamped version. The production of the connecting piece 5' can be seen, namely that the re-enforcement plate 8 is applied by putting the hooks 81 through the slots 71, and then the plate 8 is attached to the connecting piece 5' by point welding, which is not evident from the diagrams.

In the version according to FIGS. 7, 8a and 8b, the holder 3 consists of three parts, namely the connecting piece 5', the re-enforcement plate 8 with the hooks 81 and the suspension piece 9. The schematic, cross-sectional representation in FIG. 7 is similar in construction to that in FIG. 4, but the sides are reversed, because in FIG. 4 the passenger should be thought of as being on the left, therefore the connecting piece 5' is located between the panel 6 and the door column 1. In FIG. 7, on the other hand, the toothed rack and the door column are not shown at all, and the connecting piece 5' is only indicated schematically, because these pieces are the same. In contrast to the construction according to FIG. 4, the one according to FIG. 7 has a specially constructed suspension piece 9, which is hung into the recess 82 in the hooks 81 in front of the panel 6, as seen from the point of view of the passengers in the car. The panel 6 is only shown by broken lines, because it is not a necessary component for the technical design. The suspension piece 9 has two slots 90, approximately in the middle of its main plane, by means of which the suspension piece 9 can be hooked into the hooks 81 in the manner described above. The suspension piece with the deflection piece 32 with its synthetic covering 31 for deflecting the seat belt, attached by means of the holder plates 93, practically represents the actual pass-through fitting, even though the suspension piece 9 itself is actually part of the holder with the overall designation 3, along with the connecting piece 5', of which only some parts are indicated.

FIG. 8a shows a top view of the suspension piece 9 with the slots 90, and with rotating joints 91 stamped into the upper end. This form is also shown in the cross-sectional view A—A through FIG. 8a, in FIG. 8b.

These two rotating joints 91, which project out like pins, more or less represent hinge supports for the cover cap 10 shown in cross-section in FIG. 7, which can be rotated about the axis around the rotating joints 91, according to the arrow 103. This cover cap 10 is a safety mechanism for the correct locking of the suspension piece 9 into the hooks 81. On the side of the cover cap 10 which faces away from the passenger and towards the panel 6, approximately in the central area, a projection 101 juts out, with such dimensions that it can completely fill the area between the hooks 81, or take it up, of the cover cap 10 is snapped down in the direction of the arrow shown in the projection 101. Furthermore, several catches are located on the cover cap 10, one of them being, e.g., located on the bottom at 102. This catch locks into a hole 92 in the suspension piece 9, while on the opposite side of the symmetrical plane in the suspension piece 9, i.e. on the opposite side of the line formed by the slots 90, another such hole 92 is placed, according to the representation in FIG. 8a, which holds another catch, in order to hold the cap completely in place after it has been snapped down. The length of the catches 102 is constructed in such a way that they, together with the elasticity of the cap itself, absorb any horizontal play, so that the arrangement is fixed securely in the hooks, free of vibrations.

It can be advantageous if the recesses 82 are somewhat wider than the thickness of the suspension piece 9. This presents the possibility of rotating the suspension piece 9, and with it the entire pass-through fitting, about a given vertical axis by approximately ±15°, so that again the desired rotational mobility is obtained, of course, restricted to the angle mentioned.

It can be seen that the construction of all the above-mentioned versions is very simple, and that installation can be carried out quickly and easily even by laymen.

It has already been stated above that the toothed rack 2 can have various cross-sections, that it can be U-shaped or shaped like a curtain rod, etc. In this case, the connecting piece and/or the re-enforcement plate 8' must be shaped correspondingly. FIGS. 9 through 12 show such changed versions. For example, the door column can be constructed in the form of a rectangular pipe, as shown in perspective in FIG. 10, with a longitudinal slot 71', and recesses 21' located on the vertical edge, which take over the function of teeth. FIG. 9 shows a cross-section of this door column 1', inside which the re-enforcement plate 8', which has a U-shaped cross-section, can be moved vertically in such a way that the hooks 81 which project from the front move in the central longitudinal slot 71', until the desired height is reached. Then the projections 56 are locked into the corresponding recesses 21'. Springs, which are not shown, can make sure that the re-enforcement plate 8' is locked into its position on the door column 1'.

I claim:

1. A holder device for adjustably securing, to a motor vehicle door column or other support member, a deflection member around which a motor vehicle safety belt or other strap is adapted to pass, said holder device comprising:
    a. A toothed rack member secured in vertical position to said door column or other support members;
    b. A connecting member of U-shaped cross sectional shape having upper and lower flanges each of which has a hole therethrough through which said toothed rack member is adapted to pass; and
    c. Compression spring biasing means for biasing said connecting member horizontally in a direction to lock said connecting member on said toothed rack member;
    d. The position of said connecting member on said rack member being manually adjustable vertically by pressing said spring means to unlock said connecting member from said rack member.

2. A holder device according to claim 1 characterized in that said toothed rack member is circular in cross section and in that the teeth of said rack member extend approximately over only one half of its circumference as viewed in cross section.

3. A holder device according to claim 2 characterized in that said holes in said upper and lower flanges of said connecting member have a diameter approximately equal to that of the said toothed rack member which is adapted to pass therethrough.

4. A holder device according to claim 3 wherein a slot is provided at the ends of the flanges of the connecting member to permit limited angular movement of said connecting member relative to said door column or other support.

5. A holder device according to claim 1 wherein:
 a. At least one hook projects forwardly from said connecting member approximately perpendicular to said toothed rack member, and
 b. A suspension member is supported on said hook.

6. A holder device according to claim 5 wherein said deflection member is supported by said suspension member.

7. A holder device according to claim 6 wherein a cover cap is hinged pivotally to said suspension member.

* * * * *